United States Patent [19]

Barbush

[11] 4,102,164
[45] Jul. 25, 1978

[54] THEFT PREVENTION APPARATUS FOR A MOTOR VEHICLE

[75] Inventor: Joseph F. Barbush, Country Club Hills, Ill.

[73] Assignee: Allen Taradash, Des Plaines, Ill.

[21] Appl. No.: 810,362

[22] Filed: Jun. 27, 1977

[51] Int. Cl.² ............... E05B 65/19; B60R 25/04
[52] U.S. Cl. .............................. 70/241; 70/283; 180/114; 200/44; 200/61.67
[58] Field of Search ............... 70/241, 240, 254, 255, 70/283; 292/144, DIG. 14; 200/44, 61.67; 307/10 AT; 180/114

[56] References Cited

U.S. PATENT DOCUMENTS

| | | | |
|---|---|---|---|
| 1,200,267 | 10/1916 | Sunnergren | 70/240 X |
| 1,519,904 | 12/1924 | Cummings | 70/241 |
| 1,825,413 | 9/1931 | Norviel | 70/241 |
| 3,282,369 | 11/1966 | Pangborn | 70/241 X |
| 3,494,156 | 2/1970 | Schweizer et al. | 70/241 |
| 3,731,963 | 5/1973 | Pond | 70/241 X |
| 3,744,285 | 7/1973 | Barmherzig | 70/241 |
| 3,820,361 | 6/1974 | Leitner | 70/241 |
| 3,934,102 | 1/1976 | Barcik et al. | 200/44 |

Primary Examiner—James T. McCall
Assistant Examiner—William E. Lyddane
Attorney, Agent, or Firm—Merriam, Marshall & Bicknell

[57] ABSTRACT

Theft prevention apparatus is disclosed which automatically locks the hood of a motor vehicle and disables the ignition system of the vehicle whenever the engine of the vehicle is turned off. When the vehicle's ignition switch is turned off, a solenoid coupled to the ignition system by a relay is selectively energized to disengage a latching member from a transverse radial groove provided in a slide member. Responsively, the slide member, under the influence of a bias spring, travels to an enabling position where it actuates a microswitch which disables the ignition system. The slide member is also coupled to a hood lock mechanism by the slide wire of a flexible cable and locks the hood lock mechanism when it is at the enabling position. A key-operated release mechanism is provided to manually retract the slide member to reset the apparatus.

11 Claims, 2 Drawing Figures

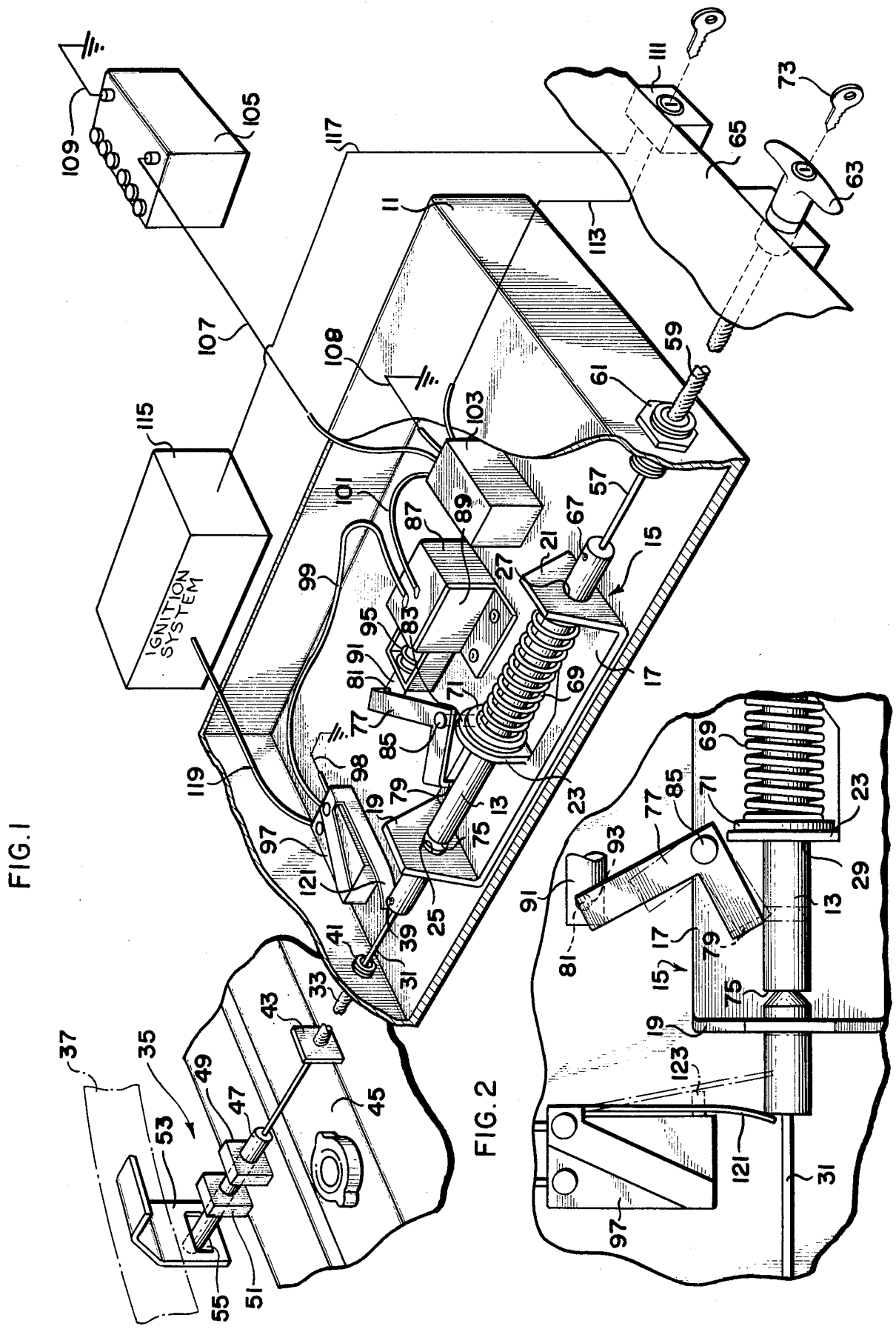

THEFT PREVENTION APPARATUS FOR A MOTOR VEHICLE

BACKGROUND OF THE INVENTION

The present invention relates generally to theft prevention apparatus for motor vehicles and more particularly to apparatus for automatically locking the hood of a motor vehicle and disabling the vehicle's ignition system whenever the ignition switch of the vehicle is turned off, all without further action by the operator.

Reference may be made to the following U.S. Pat. Nos. 3,820,361; 3,744,285; 3,731,963; 3,494,156; 3,282,369; 1,933,736; 1,825,413; and 1,200,267.

Over the years many different theft prevention apparatus for motor vehicles have been developed, including alarm systems, hood locking apparatus, and ignition locking systems. Despite the disparity in designs, all such systems are intended to forestall theft of the vehicle itself or entrance into the vehicle by a thief to strip the vehicle of various components such as tape players, citizen band radios, batteries, and the like.

In prior art theft prevention apparatus, however, the operator of the vehicle has generally been required to take additional action to enable the theft prevention apparatus upon leaving the car. In many systems, the apparatus is key operated, and the operator must insert the key in a lock located on the outside of the vehicle or in some secret location in the passenger compartment. However, many times the operator does not intend to be away from his vehicle for a long period of time and the extra step required to activate the theft prevention system is not taken as a matter of convenience, leaving the vehicle unguarded.

SUMMARY OF THE INVENTION

The present invention, therefore, is directed to theft prevention apparatus for a motor vehicle which precludes the theft of or stripping of parts from a motor vehicle as heretofore commonly resulted from the failure of the operator to enable theft prevention apparatus provided on the vehicle. The theft prevention apparatus of the present invention is effective to automatically lock the hood and disable the ignition system of the vehicle whenever the engine is turned off, without requiring further enabling operations by the operator.

In accordance with the general concepts of the present invention, the theft prevention apparatus comprises a slide member, preferrably cylindrical, adapted to move reciprocally in a longitudinal direction and having a transverse radial groove therein. A latching member is pivotably mounted adjacent the slide member to engage the groove in the slide member and hold the slide member removed from an enabling position toward which the slide member is biased by a spring. A solenoid coupled to the ignition system by a relay is energized by electrical current from the vehicle's battery to pivot the latching member away from engagement with the groove in the slide member when the ignition system is switched off. Responsively, the slide member, under the influence of the spring bias, moves to the enabling position where it contacts a switch which disables the ignition system and which also opens the electrical circuit of the solenoid to de-energize the solenoid, causing the solenoid to pivot the latching member against the slide member. A flexible cable having a slide wire attached to the end of the slide member runs to a hood lock mechanism and causes the hood lock mechanism to simultaneously lock the hood in a closed position on the vehicle. Apparatus is also provided for retracting the slide member against the spring bias until the latching member engages the groove in the slide member, permitting the hood to be opened and releasing the switch to enable the ignition system. Accordingly, the automatically enabled theft prevention apparatus of the present invention is effective to lock the hood to prevent access to the engine compartment by an intruder and to disable the ignition system to prevent the vehicle from being driven away.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in several figures and in which:

FIG. 1 is a pictorial representation illustrating the theft prevention apparatus of the present invention installed in a motor vehicle; and, FIG. 2 is a partial top plan view of a portion of the apparatus illustrating the action of the slide member acting in conjunction with the latching member and the microswitch to lock the hood and disable the ignition system of the motor vehicle.

DETAILED DESCRIPTION

With reference now to the drawings, the apparatus of the present invention is housed in a box-like enclosure 11 which is preferably mounted within the engine compartment of the motor vehicle, for example, on the fire wall separating the engine compartment from the passenger compartment or on the wall of the wheel well. The enclosure 11 should be substantially moisture-proof and dust-proof to prevent the apparatus contained therein from malfunctioning.

The apparatus contained in the enclosure 11 includes a slide member 13 comprising a cylindrical rod which is slidably mounted in a bracket 15 secured to the floor of the enclosure 11. In the present embodiment, the bracket 15 comprises a base 17 having integral upturned flanges 19, 21 at each end thereof and an intermediate flange 23 which is punched from the base 17 and bent to an upstanding position. In operation, as hereinafter described in greater detail, the cylindrical slide member 13 reciprocates in the longitudinal direction through aligned apertures 25, 27, 29 in the flanges 19, 21, 23, respectively.

One end of the slide member 13 is coupled to the slide wire 31 of a flexible cable, such as a bicycle brake cable, extending in an armor sheathed cable 33 from the enclosure 11 to a hood locking mechanism 35 provided to lock the hood 37 in the closed position. In particular, the armored cable 33 is mounted to the enclosure 11 by a passthrough connector 41, and the slide wire 31 extends through the connector 41 into the enclosure where it is secured to the end of the slide member 13 by a setscrew 39. The cable 33, in turn, is routed to the front of the engine compartment where it mounts to a bracket 43 secured to any one of several rigid members 45 commonly found in the engine compartment of a motor vehicle such as an automobile. At that point, the other end of slide wire 31 extends from the armored cable 33 to connect to the hood locking mechanism 35.

In the particular embodiment shown in FIG. 1, the locking mechanism 35 comprises, for example, a bolt 47 coupled to the slide wire 31 and slidably mounted by a pair of flanges 49 and 51 to be aligned with the aperture 55 of a downwardly extending bracket 53 secured to the underside of the hood 37. Accordingly, when the bolt 47 is extended through the aperture 55 in bracket 53, the hood 37 is locked in the closed position.

The other end of the cylindrical slide member 13 is coupled to the slide wire 57 of a second flexible cable extending through an armor sheathed cable 59 from the enclosure 11 to the passenger compartment of the vehicle. More particularly, the slide wire 57 extends through a passthrough connector 61 mounting the cable 59 to the enclosure 11 and is secured to slide member 13 by a setscrew 69. The other end of the armor sheathed cable 59 extends through the fire wall (not shown) separating the passenger compartment from the engine compartment to a release mechanism 63 having a key-operated lock 64. The release mechanism 63 may be mounted, for example, beneath the dash 65 in the passenger compartment as shown in FIG. 1. There, the other end of slide wire 57 is coupled to the release mechanism 63 which functions to disable the theft prevention apparatus.

As illustrated in FIG. 1, the slide member 13 is biased toward an "active", or enabling, position, i.e., to the left in FIG. 1, to lock the hood locking mechanism 35 by a spring 69 which encircles the slide member 13. The spring 69 encircles the slide member 13 between flange 21 and a washer 71 attached to the slide member, the slide member 13 being fully extended to the apparatus enabling position when washer 71 is stopped by and abuts flange 23. The slide wire 31 translates the positioning of the slide member 13 to the bolt 47 of locking mechanism 35, and accordingly, when the slide member 13 is biased to the enabling position, the bolt 47 engages the hood bracket 53 to lock the hood 37.

The hood 37, in turn, is unlocked by means of the key-operated release mechanism 63 in the passenger compartment. In particular, when the operator of the motor vehicle unlocks the lock 64 with key 73, the operator is able to pull on the handle of the release mechanism 63 to manually retract the slide member 13 from its apparatus enabling position against the bias of spring 69, the act of pulling the release mechanism 63 in the passenger compartment being translated through the slide wire 57 to the cylindrical slide member 13. Correspondingly, the slide wire 33 attached to the other end of the slide member 13 retracts the bolt 47 from bracket 53 to unlock the hood locking mechanism 35.

The bolt 47 of the hood locking mechanism is secured in the unlocked position during normal operation of the vehicle by a latching member 77 which engages an encircling transverse radial groove 75 in the cylindrical slide member 13 to hold the slide member to the right from the apparatus enabling position against the bias of the spring 69. In particular, the groove 75 has a radially extending rear surface and a front sloped camming surface connecting its radial surface to the outer surface of the cylindrical slide member 13. The latching member 77 is substantially L-shaped, further having a downwardly extending flange 79 at one end and a downwardly extending tab 81 at the other end, and is mounted adjacent the slide member 13 on a post 83. The latching member 77 is secured to the post 83 by a fastener 85 but is free to pivot such that its downwardly extending flange 79 engages the radial surface of the groove 75 of the slide member 13, as illustrated by the ghost lines in FIG. 2, to maintain the theft prevention apparatus in its disabled state when the vehicle is being operated.

The latching member 77, in turn, is controlled by a solenoid 87 which, in the present embodiment, is secured to the floor of the enclosure 11, by a bracket 89. A shaft 91 extending from the solenoid 87 has a hole 93 therein which is engaged by the tab 81 of the pivoted latch member 77. When the solenoid 87 is not energized, the shaft 91 is biased outwardly relative to the solenoid 87 by a spring 95 to pivot the latching member 77 and press the flange 79 extending downwardly from the latching member 77 against the cylindrical slide member 13, and thus, when the latching member 77 engages the groove 75, the apparatus of the present invention is disabled.

As shown in FIG. 1, the solenoid 87 is electrically coupled to ground through a microswitch 97 and connecting conductors 98 and 99 while the other terminal of the solenoid 87 is coupled by conductor 101 to a relay 103 interposed in the ignition circuit of the vehicle between the battery 105 and the ignition switch 111. In particular, the relay 103 is referenced to ground via wire 108, and one terminal is coupled to the battery 105 by conductor 107 while the other terminal of the relay 103 is coupled to the ignition switch 111 of the motor vehicle by conductor 113. The other terminal of the key-operated ignition switch 111 is coupled to the ignition system 115 by a conductor 117. The battery 105, which, in the particular embodiment shown in FIG. 1, is referenced to electrical ground by conductor 109, supplies electrical current to the ignition system 115 through the relay 103 and the ignition switch 111 to enable the engine of the vehicle.

A lever 121 is hinged to the microswitch 97 and extends outwardly such that when the cylindrical slide member 13 is released to travel to its forward apparatus enabling position, the end of the slide member 13 engages the outwardly extending lever 121 to press the lever against the actuator button 123 of the pushbutton microswitch 97. Whenever the pushbutton 123 is depressed by the lever 121, the contacts in the microswitch 97 coupling the solenoid 87 to ground open while the microswitch instead couples the ignition system 115 to ground via conductors 98 and 119. The conductor 119 is preferably coupled to a point in the ignition system 115 which, when grounded, will disable the ignition system and prevent the operation of the motor vehicle, for example, the secondary of the coil.

Operationally, whenever the motor vehicle is in use and the ignition switch 111 is switched "on", electrical power is supplied to the ignition system 115 from the battery 105 through the relay 103 and the ignition switch 111. In this mode of operation, the wire 119 to the ignition system 115 is open circuited and no electrical current is supplied to the solenoid 87. Accordingly, the pivoted latch member 77 is held in engagement with the notch 75 in the cylindrical slide member 13 to maintain the hood locking mechanism 35 in the open position and to keep the end of the slide member 13 away from the lever 121 associated with the microswitch 97.

In accordance with the principles of the present invention, however, the apparatus is effective to automatically lock the hood locking mechanism 35 and disable the ignition system 115 without further operator action whenever the ignition switch of the motor vehicle is turned to the "off" position. More particularly, upon opening the ignition switch 111 by switching the ignition switch off, the relay 103 switches to supply electrical current from the battery 105 to the solenoid 87 through conductor 101. As hereinbefore described, when the microswitch actuator button 123 is not depressed, and accordingly, the other terminal of the solenoid 87 is referenced to ground through the microswitch 97 and the electrical current energizes the solenoid 87. When thus enabled, the solenoid 87 withdraws the shaft 91 against the bias of spring 95 into the core of the solenoid, and in turn, the pivoted latching member 77, which is coupled to shaft 91 by the tab 93 extending downwardly into hole 93, pivots to disengage flange 79 from the notch 75 in the cylindrical slide member 13. As a result, the slide member 13 moves forward to its apparatus enabling position due to the bias of spring 69, and the end of the slide member 13 contacts and pushes the lever 121 associated with microswitch 97 to depress the actuator button 123 of the microswitch. When the actuator button 123 of the microswitch is thereby closed, the connection between the solenoid 87 and ground through microswitch 97 is opened and the solenoid 87 is deenergized. The shaft of the solenoid 87 is then biased outwardly by the spring 95 to again force the downward extending flange 79 of the pivoted latching member 77 against the surface of the cylindrical slide member 13. However, at this point of the operation, the slide member 13 has been released to slide forward in the bracket 15, and thus the downward extending flange 79 does not engage the groove 75. Simultaneously with opening the ground connection to the solenoid 87, the microswitch 97 grounds to the ignition system 115 by coupling the terminal to which conductor 119 is coupled to ground, automatically disabling the ignition system of the vehicle. Further, as hereinbefore described, when so released, the slide member 13 acts through slide wire 31 to engage bolt 47 in the aperture 55 of the hood bracket 53 to automatically lock the hood 37 in the closed position.

Thereafter, when the motor vehicle is to be used, the operator must first turn the ignition switch to the "on" position and then disable the theft prevention apparatus of the present invention before the ignition system 115 can be operated to start the vehicle. In particular, the operator must unlock the key-operated release mechanism 63 with the key 73 and manually pull the release handle outwardly against the bias of spring 69 to retract the slide member 13 via slide wire 57 until the notch 75 engages with the downwardly extending flange 79. That is, when the slide member 13 has been retracted, the downwardly extending flange 79 will snap into engagement with the groove 75 of the slide member 13, and the ignition system 115 will function to start the motor vehicle.

Accordingly, there has been hereinbefore shown and described apparatus for automatically locking the hood of a motor vehicle in the closed position to prevent an intruder from gaining access to the engine compartment of the vehicle to disable the apparatus of the present invention. Moreover, the apparatus of the present invention is effective to disable the ignition system of the motor vehicle by grounding the system. The apparatus of the present invention has the added advantage of being disabled automatically without further action by the operator of the vehicle other than switching off the ignition system. That is, no additional steps are required to activate the system, and, accordingly, the system is always enabled whenever the vehicle is left unattended with its motor shut off.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

I claim:

1. Apparatus for automatically locking the hood of a motor vehicle and disabling the ignition system of the vehicle when the ignition system is switched off, said apparatus comprising:
   hood lock means adapted to lock said hood in a closed position;
   means including a slide member adapted to move reciprocally in a longitudinal direction,
   said slide member having a transverse radial groove;
   means coupling said slide member to said hood lock means for translating the positioning of said slide member to said hood lock means to lock said hood lock means when said slide member is in an enabling position and to unlock said hood lock means when said slide member is removed from said enabling position;
   means for biasing said slide member toward said enabling position;
   means including a latching member for engaging said groove of said slide member to hold said slide member removed from said enabling position;
   means coupled to the ignition system for withdrawing said latching member from engagement with said groove to release said slide member to slide to said enabling position responsive to the ignition system being switched off; and,
   means including a switch positioned to engage said slide member when said slide member is at said enabling position for disabling the ignition system when said slide member engages said switch.

2. The apparatus of claim 1 including means for retracting said slide member from said enabling position to unlock said hood lock means and enable the ignition system.

3. The apparatus of claim 2 wherein said retracting means comprises a release mechanism and means coupling said release mechanism to said slide member, said release mechanism being manually operable to pull said slide member from said enabling position against the influence of said biasing means and said coupling means translating said manual pulling operation to said slide member.

4. The apparatus of claim 3 wherein said release mechanism includes a key-operated lock for disabling said release mechanism and wherein said release mechanism coupling means comprises a flexible cable having a slide wire coupling said slide member to said release mechanism.

5. The apparatus of claim 1 wherein said means for withdrawing said latching member from engagement with said groove comprises a solenoid, said solenoid being electrically coupled to a reference potential through said switch when said slide member is removed from said enabling position, and a relay coupled to the ignition system for energizing said solenoid to withdraw said latching member responsive to the ignition system being switched off.

6. The apparatus of claim 5 wherein said reference potential is at ground and including means for biasing said latching member toward said slide member, said switch disconnecting said solenoid from said ground reference potential to disable said solenoid responsive to said slide member engaging said switch, said switch further coupling the ignition system to said ground reference potential to disable the ignition system responsive to said slide member engaging said switch, said latching member biasing means biasing said latching member to engage said slide member when said solenoid is disabled.

7. The apparatus of claim 6 wherein the motor vehicle includes a battery and an ignition switch electrically coupled to said battery for coupling electrical current from said battery to the ignition system to enable the ignition system when said ignition switch is closed and wherein said relay is interposed between said battery and said ignition switch to couple said electrical current to said solenoid to energize said solenoid when said ignition switch is initially opened.

8. The apparatus of claim 6 wherein said solenoid has a movable shaft, wherein said latching member biasing means comprises a spring for biasing said shaft outwardly from said solenoid when said solenoid is disabled, and wherein said latching member comprises a pivoted L-shaped member coupled to said shaft and having a downwardly extending flange for engaging said slide member, said shaft extending to pivot said L-shaped member when said solenoid is disabled such that said flange engages said slide member, said solenoid withdrawing said shaft to pivot said L-shaped member such that said flange disengages said slide member to release said slide member when said solenoid is energized.

9. The apparatus of claim 6 including means for retracting said slide member from said enabling position, said retracting means comprising a release mechanism and means for coupling said release mechanism to said slide member, said release mechanism being manually operable to pull said slide member from said enabling position against the influence of said biasing means until said latching member engages said groove, said coupling means translating said manual pulling operation to said slide member.

10. The apparatus of claim 1 wherein said coupling means comprises a flexible cable having a slide wire coupling said slide member to said hood lock means.

11. The apparatus of claim 1 wherein said slide member comprises a cylindrical rod.

* * * * *